(12) United States Patent
Khan et al.

(10) Patent No.: US 11,598,672 B2
(45) Date of Patent: Mar. 7, 2023

(54) PLASMONICALLY ENHANCED, ULTRA-SENSITIVE BOLOMETRIC MID-INFRARED DETECTOR

(71) Applicant: THE REGENTS OF THE UNIVERSITY OF CALIFORNIA, Oakland, CA (US)

(72) Inventors: Mohammad Wahiduzzaman Khan, Irvine, CA (US); Ozdal Boyraz, Irvine, CA (US); Jonathan Sullivan, Irvine, CA (US); Jaeho Lee, Irvine, CA (US); Ziqi Yu, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/545,406

(22) Filed: Dec. 8, 2021

(65) Prior Publication Data
US 2022/0178756 A1    Jun. 9, 2022

Related U.S. Application Data

(60) Provisional application No. 63/123,297, filed on Dec. 9, 2020.

(51) Int. Cl.
*G01J 5/08* (2022.01)
*G01J 5/48* (2022.01)
*G01J 5/20* (2006.01)

(52) U.S. Cl.
CPC ............ *G01J 5/0815* (2013.01); *G01J 5/20* (2013.01); *G01J 5/48* (2013.01)

(58) Field of Classification Search
CPC .... G01J 5/0815; G01J 5/20; G01J 5/48; G01J 5/0837; G01J 2005/0077
See application file for complete search history.

(56) References Cited

U.S. PATENT DOCUMENTS

| | | | |
|---|---|---|---|
| 10,101,212 B1* | 10/2018 | Cleary | G01J 5/10 |
| 10,184,839 B1* | 1/2019 | Brown | C23C 14/165 |
| 2014/0183366 A1* | 7/2014 | Cole | G01J 5/0803 438/73 |
| 2017/0314995 A1* | 11/2017 | Rocznik | G01J 5/20 |
| 2018/0335341 A1* | 11/2018 | Baek | H01L 21/02172 |
| 2019/0049755 A1* | 2/2019 | Syllaios | G02F 1/015 |

(Continued)

OTHER PUBLICATIONS

Khan et al. "Selective and efficient infrared detection by plasmonically heated vanadium-dioxide nanowire" SPIE Nanoscience + Engineering; SPIE Digital Library; Sep. 8, 2020; 6 pages.

(Continued)

*Primary Examiner* — David P Porta
*Assistant Examiner* — Gisselle M Gutierrez
(74) *Attorney, Agent, or Firm* — Nguyen Tarbet LLC

(57) ABSTRACT

The present invention features a novel design for a bolometric infrared detector focused on LWIR range for human body high-resolution temperature sensing. The present invention incorporates an efficient plasmonic absorber and $VO_2$ nanobeam to facilitate improvement in both aspects—thermal resolution and spatial resolution. The present invention significantly improves the detectivity, NETD, and responsivity for a smaller form-factor detector active area.

20 Claims, 6 Drawing Sheets
(6 of 6 Drawing Sheet(s) Filed in Color)

(56) References Cited

U.S. PATENT DOCUMENTS

2019/0316968 A1* 10/2019 Baek ...................... H01C 17/12
2020/0003622 A1* 1/2020 Yung ....................... D01F 9/127

OTHER PUBLICATIONS

Khan et al. "High Sensitivity Long-wave Infrared Detector Design based on Integrated Plasmonic Absorber and VO2 Nanobeam" IEEE Journal of Quantum Electronics 57.4 (2021): 11 pages.

* cited by examiner

FIG. 6A
FIG. 6B
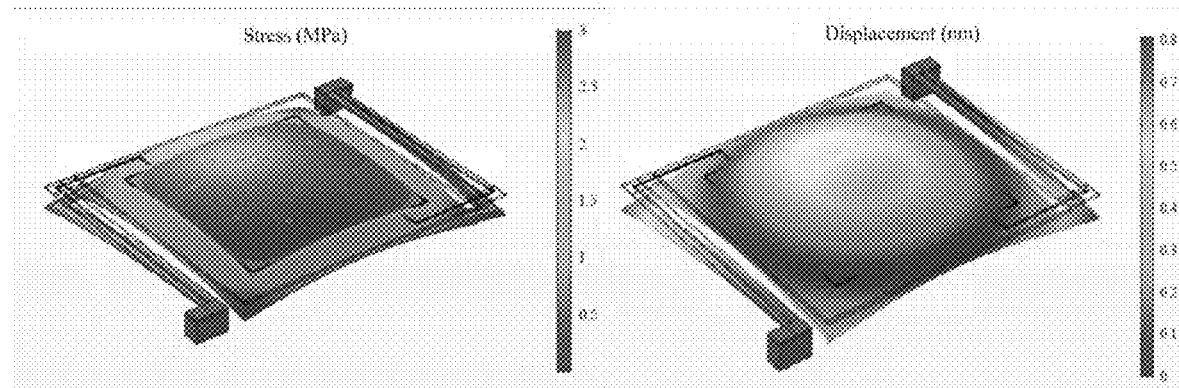
FIG. 7A
FIG. 7B
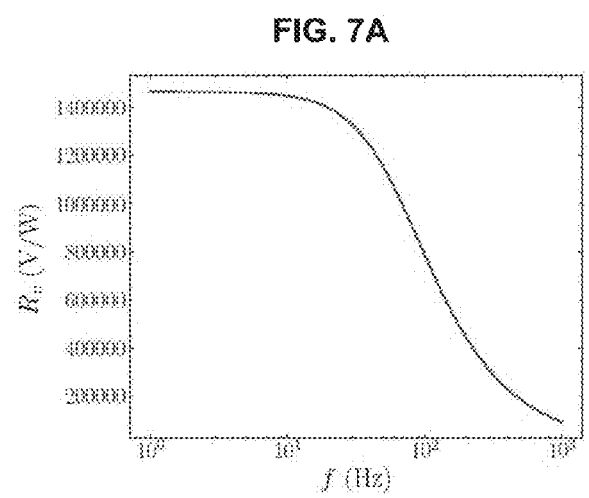
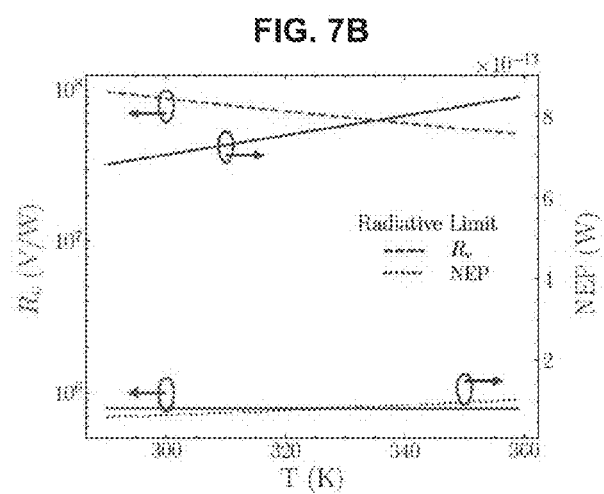

PLASMONICALLY ENHANCED, ULTRA-SENSITIVE BOLOMETRIC MID-INFRARED DETECTOR

CROSS-REFERENCES TO RELATED APPLICATIONS

This application is a non-provisional and claims benefit of U.S. Provisional Application No. 63/123,297 filed Dec. 9, 2020, the specification of which is incorporated herein in their entirety by reference.

FIELD OF THE INVENTION

The present invention features an infrared detection device that integrates efficient, selective, and scalable plasmonic absorber with a high-temperature coefficient of resistance (TCR) material (e.g., a $VO_2$ nanobeam transducer), which allows for improvement of both thermal resolution and spatial resolution.

BACKGROUND OF THE INVENTION

The two main types of infrared (IR) detectors are thermal detectors and photon detectors. The thermal detectors function based on the principles of temperature dependent phenomena—change in resistance, voltage generation injunction, change in polarization, thermal expansion of gas, etc. On the other hand, photon detectors function by converting IR radiation into photo generated free carriers. At present, high-performance infrared imaging technology is mainly based on epitaxially grown structures of the small-bandgap bulk alloy mercury-cadmium-telluride (MCT). Quantum-well infrared photodetectors based on indium antimonide (InSb), gallium arsenide (GaAs), indium gallium arsenide (InGaAs), and others are also available.

However, these technologies require extremely low operating temperature (<240K) increasing the bulkiness and cost of the system. The need for increased performance of the infrared detectors has driven extensive research towards the improvement in current IR detection technology as well as spurred novel techniques and sensors. The advancement of integrated optics and photonic integrated circuits has brought forward both IR detection and readout capability in the same chip. However, there is still a requirement for higher sensitivity for critical applications and high-resolution thermal imaging and sensing for medical and military purposes.

Phase-changing materials (PCM) hold significant potential in optical and thermal sensing and switching due to their sharp temperature dependent characteristics. Vanadium dioxide ($VO_2$) is the most utilitarian PCM because of its close-to-room-temperature transition point. The most commonly reported value for this semiconductor-to-metal transition temperature of $VO_2$ films is 68° C. However, the film and deposition technique can be engineered to further lower the transition even closer to the room temperature with a narrower hysteresis. At the transition point, the resistivity of $VO_2$ material undergoes over three to four orders of change in magnitude. $VO_2$-based bolometers utilize the material's large temperature coefficient of resistivity (TCR) to detect infrared radiation.

However, to achieve high sensitivity, the active radiation absorption area needs to be large enough that allows sufficient temperature buildup from incident radiation absorbed by $VO_2$, thus requiring a large pixel dimension, and degrading the spatial resolution of bolometric sensing. The close co-existence of different oxides of deposited vanadium films in most detectors degrades the TCR of the material. Moreover, the absorption by the $VO_2$ material is not optimized for a specific frequency band in most of the applications. On the other hand, plasmonic micro- and nanostructures can be tuned and designed to selectively and efficiently absorb a specific band of the incident radiation for local heating and thermal imaging. The prevalent design dilemma between the obtained thermal resolution and spatial resolution, bolometric bandwidth and performance, sensitivity, and noise need to be analyzed in order to achieve an optimized detector.

The present invention features a novel infrared detector architecture that integrates an efficient, selective, and scalable plasmonic absorber with a high-sensitivity $VO_2$ nanobeam transducer. The goal of such design is to improve both—thermal resolution as well as spatial resolution and to address the challenge of low thermal contrast at a longer wavelength (LWIR). To achieve maximum sensitivity, the present invention operates the detector at the transition temperature to exploit the high TCR of $VO_2$. The use of $VO_2$ nanobeam instead of a thin film allows amplified TCR and a larger slope of impedance variation in response to local heating by radiation absorption. The performance, bandwidth, and noise analysis of the integrated detector designed for LWIR detection for the human body as the radiation-emitting object (310K or ~10 µm wavelength) are also presented.

BRIEF SUMMARY OF THE INVENTION

It is an objective of the present invention to provide a bolometer device that allows for the preservation of spatial and thermal resolution, as specified in the independent claims. Embodiments of the invention are given in the dependent claims. Embodiments of the present invention can be freely combined with each other if they are not mutually exclusive.

The present invention features a room temperature IR detector comprising an integrated plasmonic absorber and high-temperature coefficient of resistance (TCR) nanobeam (e.g., a $VO_2$ nanobeam). The present invention improves both—thermal resolution as well as spatial resolution and addresses the challenge of low thermal contrast at long-wavelength infrared (LWIR). To achieve maximum sensitivity, the detector is operated at the transition temperature to exploit the high temperature coefficient of resistivity (TCR) of $VO_2$. The use of $VO_2$ nanobeam instead of a thin-film allows amplified temperature-dependent resistance thus a larger slope of impedance variation in response to local heating by radiation absorption. The performance, bandwidth, and noise analysis of the integrated detector designed for LWIR detection for the human body as the radiation-emitting object (310K or 10 µm wavelength) are also presented. It is estimated that the responsivity of the proposed detector to be over 700 kV/W at 100 Hz with ultra-low noise equivalent temperature difference (NETD) in a small footprint pixel size of 12 µm by 12 µm.

The plasmonic absorber allows efficient and selective radiation detection from the radiating object. The design of the absorber can be scaled to tune the wavelength or temperature band of interest. Additionally, the sub-wavelength plasmonic features allow the detection of wavelength by a detector with a much smaller form factor. The use of $VO_2$ nanobeam, instead of a simple $VO_2$ film, amplifies the slope of the temperature dependent resistance due to the large ratio between length to the cross-sectional area of the nanobeam. The present invention shows significant improvements in spatial resolution as well as thermal responsivity. Based on application and suitability, other high-TCR nanobeams can be used in the detector as well.

The present invention features an infrared detection device. In some embodiments, the device comprises a support structure. In some embodiments, the device comprises a radiation absorber. In other embodiments, the device comprises a radiation absorber deposited onto a support layer. In some embodiments, the radiation absorber comprises a first metal layer disposed on the support structure, wherein the first metal layer is sandwiched between the support structure and the insulator layer; an insulator layer disposed on the first metal layer; and a second metal layer disposed on the insulator layer, wherein the second metal layer is patterned. In other embodiments, the device comprises a high-temperature coefficient of resistance (TCR) nanobeam (e.g., a vanadium-dioxide ($VO_2$) nanobeam) embedded with the radiation absorber. In some embodiments, the detector can be placed in a two-dimensional array with electronics to create an active detector area for imaging. In further embodiments, the device is configured to detect infrared radiation at ambient temperatures.

The present invention may also feature an infrared detection device. In some embodiments, the device comprises a support structure. In other embodiments, the device comprises a plurality of alternating metal and insulator layers disposed on the support structure. In other embodiments, the device comprises a high-temperature coefficient of resistance (TCR) nanobeam (e.g., vanadium-dioxide ($VO_2$) nanobeam) embedded with the radiation absorber. In further embodiments, the device is configured to detect infrared radiation at ambient temperatures.

The present invention may further feature a method of detecting infrared radiation close to background. In some embodiments, the method comprises placing one or more infrared detection devices adjacent to an object; detecting a change in the resistance of a nanobeam in the infrared detection device; and producing a thermal map of the object based on the change in resistance of the nanobeam.

The present invention features a room-temperature thermal imaging and infrared detection device using a novel bolometric sensor that absorbs long-wave infrared (LWIR 8 to 12 µm) for human body radiation (between 310-315 K). In some embodiments, human body radiation peaks at 9.3 µm. In other embodiments, the device is scalable to other wavelength ranges by changing the geometry and materials of the device.

One of the unique and inventive technical features of the present invention is the efficient, selective, and scalable plasmonic absorber integrated with a high-sensitivity $VO_2$ nanobeam transducer. Without wishing to limit the invention to any theory or mechanism, it is believed that the technical feature of the present invention advantageously improves both thermal resolution as well as spatial resolution and addresses the challenge of low thermal contrast at longer wavelength (LWIR). None of the presently known prior references or work has the unique inventive technical feature of the present invention.

In fact, the prior references teach away from the present invention. For example, it is currently believed that the use of a wire instead of film adds to the thermal noise of the device, and bolometers of prior references utilize a $VO_2$ or an Si film as the transducing material. However, due to fabrication limitations and the coexistence of multiple vanadium oxides, the deposited $VO_2$ film does not have a sharp transduction, thus it has poor thermal sensitivity. In the present invention, while the inventors' use of a $VO_2$ nanobeam in the device caused some increase in thermal noise, the inventors surprisingly found that this was less than the increase in responsivity seen with the device.

Furthermore, the inventive technical features of the present invention contributed to a surprising result. For example, conventionally the spatial resolution trades off with the thermal resolution. However, the design of the present invention brings forth improvement on both ends. The sub-wavelength plasmonic elements make it possible to absorb the radiation efficiently by smaller than state-of-the-art pixel size. On the other hand, the reduced cross-sectional dimension of the $VO_2$ transducer boosts the temperature dependent resistance and readout signal fluctuation and thus the ultimate sensitivity of the detector.

Additionally, a HgCdTe (MCT) is the most commonly used semiconductor-based IR detection, however, these devices are costly, require low temperatures to operate, have limited selectivity, and are a health hazard. Furthermore, bolometers using superconductor designs require cryogenic temperatures (<50 K) to get to the transition point of the superconductor and require an expensive cooling system to operate. Unlike the bolometric devices using superconductors, the present invention features a device that is able to operate at room temperature and requires no cooling to function properly.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 1A shows a schematic of a single bolometer pixel showing the support structure, suspension arms, plasmonic array of 3×3-unit cells as selective radiation absorbers.

FIG. 1B shows a plasmonic absorber unit cell with the $VO_2$ nanobeam buried within the insulator of a metal-insulator-metal (MIM) type absorber and the cross-sectional view of the unit cell with material layer thicknesses. In the present default design, to obtain maximum absorptance at 10 µm wavelength, antenna and ground layers are chosen to be gold (Au) with $t_{Antenna}=20$ nm and $t_{Ground}=50$ nm. Nanobeam transducing material is vanadium dioxide ($VO_2$) with $t_{NB}=20$ nm and $W_{NB}=100$ nm, insulator layer is magnesium fluoride ($MgF_2$) with $t_{Insulator}=30$ nm, and support layer is silicon nitride ($Si_3N_4$) with $t_{Support}=200$ nm. The default disk antenna diameter, D=2.6 µm and unit cell period, P=3 µm.

FIG. 2A and FIG. 2B shows the effect of duty cycle or diameter variation when the period is 3 µm—FIG. 2A shows the absorption spectrum for varying antenna diameter showing tunability of peak absorption wavelength i.e., the range of object temperature. FIG. 2B shows the effect of antenna diameter variation on the peak absorptance, $A_R$ (left axis—red) and the resonant wavelength, $\lambda_R$ (right axis—blue).

FIG. 3A and FIG. 3B shows the effect of antenna thickness with unit cell period fixed at 3 μm and antenna diameter fixed at 2.6 μm—FIG. 3A shows the absorptance profile vs wavelength for thickness of the antenna or top metal layer. FIG. 3B shows the absorptance, $A_R$ (left axis—red) and wavelength, $\lambda_R$ (right axis—blue) at resonance for a range of antenna thickness.

FIGS. 4A, 4B, and 4C shows the peak absorptance, $A_R$ (left axis—red) and the wavelength of peak absorptance, $\lambda_R$ (right axis—blue) with respect to (FIG. 4A) period of absorber unit cell, (FIG. 4B) insulator thickness, and (FIG. 4C) insulator refractive index (RI) keeping all the other design parameters at default value.

FIG. 5A shows a thermal analysis of a bolometer showing the temperature map of the bolometer for a 30 nW of heat flux incidence normal from the top.

FIG. 5B shows the transient analysis of the thermal fluctuation of the detector in response to pulsed heat flux incidence. The thermal time constants for rising ($\tau_r$) and falling ($\tau_f$) edges are also calculated from this graph. The average thermal time constant, $\tau_{th}$ is calculated by averaging the rising and falling edge time constants.

FIG. 6A shows von Mises stress map of the detector showing critical regions of stress.

FIG. 6B shows the displacement due to 30 nW of radiation incidence considering the thermal expansion coefficients of the materials in the bolometric detector.

FIG. 7A shows the responsivity with respect to frequency at 341K temperature (device bias temperature to be at $VO_2$ transition). It is estimated that there is over 700 kV/W of responsivity at 100 Hz.

FIG. 7B shows the responsivity (left y-axis, red) and NEP (right y-axis, blue) at 100 Hz along with their theoretical (radiative) limit with respect to device temperature.

DETAILED DESCRIPTION OF THE INVENTION

Figure 1A:
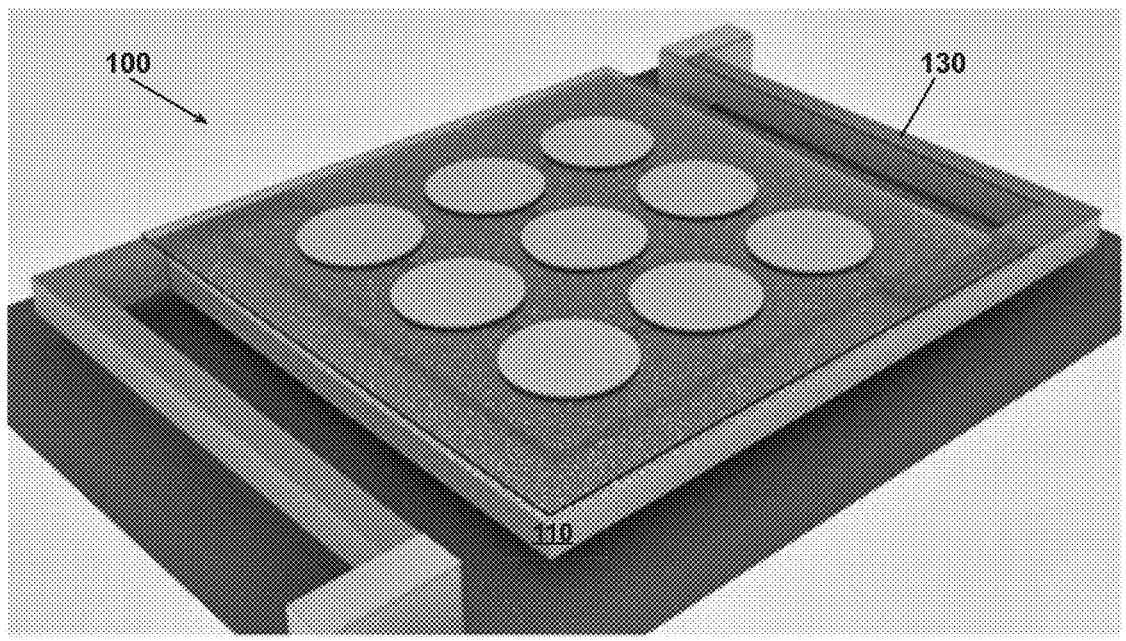

Following is a list of elements corresponding to a particular element referred to herein:

| | |
|---|---|
| 100 | Infrared detection device |
| 110 | Support structure |
| 120 | Radiation absorber |
| 121 | First metal layer |
| 122 | Insulator |
| 123 | Second metal layer |
| 130 | Nanobeam |

Referring now to FIGS. 1A-10, the present invention features an infrared detection device that integrates an efficient, selective, and scalable plasmonic absorber with a high-temperature coefficient of resistance (TCR) nanobeam (e.g., a high-sensitivity $VO_2$ nanobeam) transducer, which allows for improvement of both thermal resolution and spatial resolution.

As used herein a "plasmonic absorber" may refer to metal-insulator-metal type absorber including, but not limited to, hyperbolic metamaterial-based absorber, metasurface absorber, micro/nanostructured metallic features (disk, fishbone, square, patch, or any other shapes/dimensions).

As used herein a "nanobeam" refers to a rectangular shaped beam or series of rectangular shaped beams connected together to form a continuous trace where at least one dimension (i.e., height (i.e., thickness), width, length) is <200 nm. In one embodiment, the nanobeam (130) described herein is 20 nm thick, 100 nm wide, and a few tens of μm long.

In some embodiments, the use of a plasmonic enhancement allows for higher absorption of the radiation by the sub-wavelength components resulting in higher spatial resolution or small pixel pitch without sacrificing the sensitivity.

The present invention features an infrared detection device (100). In some embodiments, the device (100) comprises a support structure (110). In some embodiments, the device (100) comprises a radiation absorber (120). In other embodiments, the device comprises a radiation absorber deposited onto a support layer. In some embodiments, the radiation absorber (120) comprises a first metal layer (121) disposed on the support structure (110), an insulator layer (122) disposed on the first metal layer, and a second metal layer (123) disposed on the insulator layer (122). In some embodiments, the first metal layer (121) is sandwiched between the support structure (110) and the insulator layer (122). In some embodiments, the second metal layer (123) is patterned. In other embodiments, the device (100) comprises a high-temperature coefficient of resistance (TCR) nanobeam (130) (e.g., vanadium-dioxide ($VO_2$) nanobeam). In some embodiments, the TCR nanobeam (130) (e.g., the $VO_2$ nanobeam) is embedded within the radiation absorber. In other embodiments, the TCR nanobeam (130) (e.g., the $VO_2$ nanobeam) is embedded within the insulator layer (122). In some embodiments, the device (100) is placed in a two-dimensional array for thermal imaging. In some embodiments, the device is configured to detect infrared radiation at ambient temperatures.

The present invention may also feature an infrared detection device (100). In some embodiments, the device (100) comprises a support structure (110). In other embodiments, the device (100) comprises a plurality of alternating metal and insulator layers disposed on the support structure (110). In other embodiments, the device (100) comprises a high-temperature coefficient of resistance (TCR) nanobeam (130) (e.g., vanadium-dioxide ($VO_2$) nanobeam). In some embodiments, the TCR nanobeam (130) (e.g., a $VO_2$ nanobeam) is embedded with the radiation absorber.

In some embodiments, the devices (100) described herein can be configured to detect infrared radiation from objects of different temperature ranges (e.g., 300 K-2800 K) including but not limited to objects near ambient temperature (e.g, 293 K). In other embodiments, the devices (100) described herein can be configured to detect infrared radiation from objects near ambient temperatures.

In some embodiments, the device (100) is configured to detect infrared radiation at ambient temperatures (i.e, about 290 K to 300 K). In other embodiments, the devices (100) described herein are configured to detect infrared radiation from object at a temperature of about 250 K to 2800 K, or about 250 K to 2600 K, or about 250 K to 2400 K, or about 250 K to 2200 K, or about 250 K to 2000 K, or about 250 K to 1800 K, or about 250 K to 1600 K, or about 250 K to 1400 K, or about 250 K to 1200 K, or about 250 K to 1000 K, or about 250 K to 800 K, or about 250 K to 600 K, or about 250 K to 500 K, or about 250 K to 400 K, or about 250 K to 300 K, or about 300 K to 2800 K, or about 300 K to 2600 K, or about 300 K to 2400 K, or about 300 K to 2200 K, or about 300 K to 2000 K, or about 300 K to 1800 K, or about 300 K to 1600 K, or about 300 K to 1400 K, or about 300 K to 1200 K, or about 300 K to 1000 K, or about 300 K to 800 K, or about 300 K to 600 K, or about 300 K to 500 K, or about 300 K to 400 K, or about 400 K to 2800 K, or about 400 K to 2600 K, or about 400 K to 2400 K, or about 400 K to 2200 K, or about 400 K to 2000 K, or about 400 K to 1800 K, or about 400 K to 1600 K, or about 400 K to 1400 K, or about 400 K to 1200 K, or about 400 K to 1000 K, or about 400 K to 800 K, or about 400 K to 600 K, or about 400 K to 500 K. In other embodiments, the devices (100) described herein are configured to detect infrared radiation from object at a temperature of about 500 K to 2800 K, or about 500 K to 2600 K, or about 500 K to 2400 K, or about 500 K to 2200 K, or about 500 K to 2000 K, or about 500 K to 1800 K, or about 500 K to 1600 K, or about 500 K to 1400 K, or about 500 K to 1200 K, or about 500 K to 1000 K, or about 500 K to 800 K, or about 500 K to 600 K, or about 600 K to 2800 K, or about 600 K to 2600 K, or about 600 K to 2400 K, or about 600 K to 2200 K, or about 600 K to 2000 K, or about 600 K to 1800 K, or about 600 K to 1600 K, or about 600 K to 1400 K, or about 600 K to 1200 K, or about 600 K to 1000 K, or about 600 K to 800 K, or about 800 K to 2800 K, or about 800 K to 2600 K, or about 800 K to 2400 K, or about 800 K to 2200 K, or about 800 K to 2000 K, or about 800 K to 1800 K, or about 800 K to 1600 K, or about 800 K to 1400 K, or about 800 K to 1200 K, or about 800 K to 1000 K. In further embodiments, the devices (100) described herein are configured to detect infrared radiation from object at a temperature of about 1000 K to 2800 K, or about 1000 K to 2600 K, or about 1000 K to 2400 K, or about 1000 K to 2200 K, or about 1000 K to 2000 K, or about 1000 K to 1800 K, or about 1000 K to 1600 K, or about 1000 K to 1400 K, or about 1000 K to 1200 K, or about 1200 K to 2800 K, or about 1200 K to 2600 K, or about 1200 K to 2400 K, or about 1200 K to 2200 K, or about 1200 K to 2000 K, or about 1200 K to 1800 K, or about 1200 K to 1600 K, or about 1200 K to 1400 K, or about 1400 K to 2800 K, or about 1400 K to 2600 K, or about 1400 K to 2400 K, or about 1400 K to 2200 K, or about 1400 K to 2000 K, or about 1400 K to 1800 K, or about 1400 K to 1600 K, or about 1600 K to 2800 K, or about 1600 K to 2600 K, or about 1600 K to 2400 K, or about 1600 K to 2200 K, or about 1600 K to 2000 K, or about 1600 K to 1800 K, or about 1800 K to 2800 K, or about 1800 K to 2600 K, or about 1800 K to 2400 K, or about 1800 K to 2200 K, or about 1800 K to 2000 K, or about 2000 K to 2800 K, or about 2000 K to 2600 K, or about 2000 K to 2400 K, or about 2000 K to 2200 K, or about 2200 K to 2800 K, or about 2200 K to 2600 K, or about 2200 K to 2400 K, or about 2400 K to 2800 K, or about 2400 K to 2600 K, or about 2600 K to 2800 K.

In some embodiments, the devices (100) described herein are a single pixel and/or sensor. In some embodiments, the devices (100) described herein are placed in a two-dimensional array, comprising a plurality of devices (100) to form a sensor area (e.g., a camera). The devices (100) placed in a two-dimensional array enables thermal imaging. In some embodiments, the present invention features a two-dimensional array for high power detection comprising a plurality of infrared detection devices (100) as described herein wherein the devices (100) are arranged in a configuration such that the nanobeams (130) are connected to at least one neighboring device (100).

In some embodiments, the radiation absorber is a plasmonic absorber. In some embodiments, the radiation absorber (120) comprises support structure (110), a first metal layer (121), an insulator layer (122), and a second metal layer (123). In other embodiments, the radiation absorber (120) comprises a support structure (110) and a plurality of alternating metal and insulator layers.

In certain embodiments, the support structure (110) comprises a dielectric support layer with low thermal conductivity including but not limited to silicon nitride ($Si_3N_4$) and silicon dioxide ($SiO_2$). In some embodiments, the support structure (110) comprises low-thermal conductivity silicon or silicon dioxide. Other dielectric materials that can support a suspended micro/nano structure may be used as a support structure (110) in accordance with devices (100) as described herein. In some embodiments, the support structure (110) comprises multiple alternating layers of metal and dielectric materials. Non-limiting examples include but are not limited to gold (Au) and silicon dioxide ($SiO_2$)) that help reduce the thermal conductance. In alternative embodiments, a multilayer structure may be added to the bottom of the support structure (110) to trap heat more efficiently.

In some embodiments, the support structure (110) may have thermal isolation. In some embodiments, thermal isolation may refer to material that reduces the heat escape from the active detector region. For example, suspending the pixels with long and narrow arms or low-thermal conductivity materials or systems (arrangement of alternating metal and dielectric materials). In other embodiments, the support structure (110) may have no thermal isolation.

In certain embodiments, the support structure (110) can be 20 nm to 500 nm thick. In some embodiments, the support structure (110) is about 20 nm to 500 nm thick, or about 20 nm to 450 nm thick, or about 20 nm to 400 nm thick, or about 20 nm to 350 nm thick, or about 20 nm to 300 nm thick, or about 20 nm to 250 nm thick, or about 20 to 200 nm thick, or about 20 to 150 nm thick, or about 20 nm to 100 nm thick, or about 20 nm to 50 nm thick, or about 50 nm to 500 nm thick, or about 50 nm to 450 nm thick, or about 50 nm to 400 nm thick, or about 50 nm to 350 nm thick, or about 50 nm to 300 nm thick, or about 50 nm to 250 nm thick, or about 50 to 200 nm thick, or about 50 to 150 nm thick, or about 50 nm to 100 nm thick, or about 100 nm to 500 nm thick, or about 100 nm to 450 nm thick, or about 100 nm to 400 nm thick, or about 100 nm to 350 nm thick, or about 100 nm to 300 nm thick, or about 100 nm to 250 nm thick, or about 100 to 200 nm thick, or about 100 to 150 nm thick, or about 150 nm to 500 nm thick, or about 150 nm to 450 nm thick, or about 150 nm to 400 nm thick, or about 150 nm to 350 nm thick, or about 150 nm to 300 nm thick, or about 150 nm to 250 nm thick, or about 150 to 200 nm thick, or about 200 nm to 500 nm thick, or about 200 nm to 450 nm thick, or about 200 nm to 400 nm thick, or about 200 nm to 350 nm thick, or about 200 nm to 300 nm thick, or about 200 nm to 250 nm thick, or about 250 nm to 500 nm thick, or about 250 nm to 450 nm thick, or about 250 nm to 400 nm thick, or about 250 nm to 350 nm thick, or about 250 nm to 300 nm thick, or about 300 nm to 500 nm thick, or about 300 nm to 450 nm thick, or about 300 nm to 400 nm thick, or about 300 nm to 350 nm thick, or about 350 nm to 500 nm thick, or about 350 nm to 450 nm thick, or about 350 nm to 400 nm thick, or about 400 nm to 500 nm thick, or about 400 nm to 450 nm thick, or about 450 nm to 500 nm thick.

In some embodiments, the thickness of the support structure is chosen based on the mechanical strength of dielectric support material (i.e., the support structure (110)) needed to support the suspended structure.

In some embodiments, the first metal layer (121) and second metal layer (123) comprise the same material. In other embodiments, the first metal layer (121) and the second metal layer (123) comprise different materials. Non-limited examples for the material for the first metal layer (121) and the second metal layer (123) may include but are not limited to gold, silver, nickel, aluminum, platinum, tungsten, titanium, molybdenum or copper. In some embodiments, the choice of material used for the first metal layer (121) and the second metal layer (122) may be determined based on the availability, cost, and efficiency of the materials.

In certain embodiments, the metal layer is about 10 nm to 300 nm thick. In some embodiments, the metal layer is about 10 nm to 250 nm thick, or about 10 nm to 200 nm thick, or about 10 nm to 150 nm thick, or about 10 nm to 100 nm thick, or about 10 nm to 50 nm thick, or about 10 nm, to 25 nm thick, or about 25 nm to 300 nm thick, or about 25 nm to 250 nm thick, or about 25 nm to 200 nm thick, or about 25 nm to 150 nm thick, or about 25 nm to 100 nm thick, or about 25 nm to 50 nm thick, or about 50 nm to 300 nm thick, or about 50 nm to 250 nm thick, or about 50 nm to 200 nm thick, or about 50 nm to 150 nm thick, or about 50 nm to 100 nm thick, or about 100 nm to 300 nm thick, or about 100 nm to 250 nm thick, or about 100 nm to 200 nm thick, or about 100 nm to 150 nm thick, or about 150 nm to 300 nm thick, or about 150 nm to 250 nm thick, or about 150 nm to 200 nm thick, or about 200 nm to 300 nm thick, or about 200 nm to 250 nm thick, or about 250 nm to 350 nm thick. Thickness of the metal layer is optimized based on plasmonic properties of the device.

Without wishing to limit the present invention to any particular theory or mechanism it is thought that the alternating layers of metal-dielectric arrangement reduce vertical heat conduction and thus reduce the thermal conductance necessary to trap enough heat for radiation detection from moderate to high power radiation coming from the object.

As used herein, the "second metal layer," the "top metal layer," and the "top metal patches," may be used interchangeably. In some embodiments, the top metal layer (i.e., the second metal layer (122) or top metal patches) behave like an optical antenna.

In some embodiments, the top metal layer (i.e., the second metal layer (122)) is, but is not limited to an array of circular or square patches. The diameter of the circular patches determine the resonant absorption characteristics. In certain embodiments, the circular patches have a diameter of about 2.6 µm to achieve resonant absorption near 10 µm wavelength as an example.

In some embodiments, the circular patches have a diameter of 100 nm to 50 µm. In other embodiments, the circular patches have a diameter of about 0.1 µm to 50 µm, or about 0.1 µm to 40 µm, or about 0.1 µm to 30 µm, or about 0.1 µm to 20 µm, or about 0.1 µm to 10 µm, or about 0.1 µm to 1 µm, or about 0.1 µm to 0.5 µm, or about 0.5 µm to 50 µm, or about 0.5 µm to 40 µm, or about 0.5 µm to 30 µm, or about 0.5 µm to 20 µm, or about 0.5 µm to 10 µm, or about 0.5 µm to 1 µm, or about 1 µm to 50 µm, or about 1 µm to 40 µm, or about 1 µm to 30 µm, or about 1 µm to 20 µm, or about 1 µm to 10 µm, or about 10 µm to 50 µm, or about 10 µm to 40 µm, or about 10 µm to 30 µm, or about 10 µm to 20 µm, or about 20 µm to 50 µm, or about 20 µm to 40 µm, or about 20 µm to 30 µm, or about 30 µm to 50 µm, or about 30 µm to 40 µm, or about 40 µm to 50 µm. In some embodiments, the diameter of the circular patches depends on the material selection.

In some embodiments, the patches are placed periodically. In other embodiments, the patches are not placed periodically. In certain embodiments, the patches are placed periodically at a pitch range from 100 nm to 50 µm to achieve narrowband and efficient resonant absorption. Strong absorption at 10 µm wavelength can be achieved at about a 3 µm pitch with the patch diameter of about 2.6 µm.

In some embodiments, the patches are placed periodically at a pitch from about 0.1 µm to 50 µm, or about 0.1 µm to 40 µm, or about 0.1 µm to 30 µm, or about 0.1 µm to 20 µm, or about 0.1 µm to 10 µm, or about 0.1 µm to 1 µm, or about 0.1 µm to 0.5 µm, or about 0.5 µm to 50 µm, or about 0.5 µm to 40 µm, or about 0.5 µm to 30 µm, or about 0.5 µm to 20 µm, or about 0.5 µm to 10 µm, or about 0.5 µm to 1 µm, or about 1 µm to 50 µm, or about 1 µm to 40 µm, or about 1 µm to 30 µm, or about 1 µm to 20 µm, or about 1 µm to 10 µm, or about 10 µm to 50 µm, or about 10 µm to 40 µm, or about 10 µm to 30 µm, or about 10 µm to 20 µm, or about 20 µm to 50 µm, or about 20 µm to 40 µm, or about 20 µm to 30 µm, or about 30 µm to 50 µm, or about 30 µm to 40 µm, or about 40 µm to 50 µm.

In preferred embodiments, for an infrared detection device (100) with an optimal absorption at the 10 µm wavelength, a circular patch with a diameter of 2.6 µm which is placed periodically at a 3 µm pitch can be used.

In some embodiments, the variation in shape and diameter of the top metal layer patch impacts the peak absorbing wavelength. Thus, patch diameter is the parameter that needs to be changed for a design scaled for different wavelength or temperature range. As expected, a larger size patch corresponds to larger peak wavelength of absorption.

In some embodiments, the insulator layers (122) are transparent low loss dielectric, examples include but are not limited to, silicon dioxide ($SiO_2$), magnesium fluoride ($MgF_2$), germanium, calcium fluoride, or fluorides of calcium or magnesium, or any other fluoride/oxide or polymer. In some embodiments, fluorides of calcium or magnesium can be used for a wider wavelength or LWIR specific application.

In certain embodiments, the insulator layer (122) is about 30 to 300 nm thick. In some embodiments, the insulator layer (122) is about 30 nm to 250 nm thick, or about 30 nm to 200 nm thick, or about 30 nm to 150 nm thick, or about 30 nm to 100 nm thick, or about 30 nm to 50 nm thick, or about 50 nm to 300 nm thick, or about 50 nm to 250 nm thick, or about 50 nm to 200 nm thick, or about 50 nm to 150 nm thick, or about 50 nm to 100 nm thick, or about 100 nm to 300 nm thick, or about 100 nm to 250 nm thick, or about 100 nm to 200 nm thick, or about 100 nm to 150 nm thick, or about 150 nm to 300 nm thick, or about 150 nm to 250 nm thick, or about 150 nm to 200 nm thick, or about 200 nm to 300 nm thick, or about 200 nm to 250 nm thick, or about 250 nm to 300 nm thick.

In some embodiments, the radiation absorber (120) can detect the thermal radiation of a human or an animal. In other embodiments, the radiation absorber (120) can detect thermal radiation between 37-38° C. In further embodiments, the radiation absorber (120) is able to be adjusted to detect thermal radiation at other wavelengths or temperatures.

Without wishing to limit the invention to any theory or mechanism, it is believed that the dimension of the absorbers can be set to efficiently absorb a particular band of wavelength. By achieving large responsivity, it is possible to detect objects very close to room temperature. For example, from detecting the thermal map of a human body or animal of around 37° C. (peak radiating wavelength of ~10 μm) to hot industrial objects at 300-500° C. (peak radiating wavelength of 3-6 μm), and even higher.

In some embodiments, the nanobeam (130) is a high-temperature coefficient of resistance (TCR) nanobeam. As used herein, "a high-temperature coefficient of resistance (TCR)" refers to materials that can have at least 3% resistance changing properties per 1K (one degree Kelvin) of temperature variations. Non-limiting examples of high-TCR materials that may be used as a nanobeam (130) include but are not limited to vanadium oxide ($VO_2$), vanadium-pentoxide ($V_2O_5$), amorphous silicon (a-Si), aluminum, tungsten, or other high TCR metals or dielectrics.

In certain embodiments, the nanobeam (130) comprises vanadium oxide ($VO_2$). In other embodiments, the nanobeam (130) comprises a vanadium-pentoxide ($V_2O_5$). In preferred embodiments, the devices described herein comprises a $VO_2$ nanobeam. In some embodiments, the $VO_2$ nanobeam allows the detector to have enhanced sensitivity due to the fact that its resistivity shows heightened dependence on local heating.

In certain embodiments, the nanobeam (130) is about 20 nm to 200 nm thick. In further embodiments, the thickness of the nanobeam (130) depends on how many absorber elements are present in a single pixel. For example, FIG. 1A shows 9 absorber elements arranged with a pitch of 3 μm.

In some embodiments, the nanobeam (130) is about 20 nm to 150 nm thick, or about 20 nm to 100 nm thick, or about 20 nm to 50 nm thick, or about 50 nm to 200 nm thick, or about 50 nm to 150 nm thick, or about 50 nm to 100 nm thick, or about 100 nm to 200 nm thick, or about 100 nm to 150 nm thick, or about 150 nm to 200 nm thick.

In certain embodiments, the nanobeam (130) is about 100 nm to 5000 nm in width. In some embodiments, the nanobeam (130) is about 100 nm to 5000 nm in width, or about 100 nm to 4500 nm in width, or about 100 nm to 4000 nm in width, or about 100 nm to 3500 nm in width, or about 100 nm to 3000 nm in width, or about 100 nm to 2500 nm in width, or about 100 nm to 2000 nm in width, or about 100 nm to 1500 nm in width or about 100 nm to 1000 nm in width, or about 100 nm to 500 nm in width, or about 100 nm to 250 nm in width, or about 250 nm to 5000 nm in width, or about 250 nm to 4500 nm in width, or about 250 nm to 4000 nm in width, or about 250 nm to 3500 nm in width, or about 250 nm to 3000 nm in width, or about 250 nm to 2500 nm in width, or about 250 nm to 2000 nm in width, or about 250 nm to 1500 nm in width or about 250 nm to 1000 nm in width, or about 250 nm to 500 nm in width, or about 500 nm to 5000 nm in width, or about 500 nm to 4500 nm in width, or about 500 nm to 4000 nm in width, or about 500 nm to 3500 nm in width, or about 500 nm to 3000 nm in width, or about 500 nm to 2500 nm in width, or about 500 nm to 2000 nm in width, or about 500 nm to 1500 nm in width or about 500 nm to 1000 nm in width, or about 1000 nm to 5000 nm in width, or about 1000 nm to 4500 nm in width, or about 1000 nm to 4000 nm in width, or about 1000 nm to 3500 nm in width, or about 1000 nm to 3000 nm in width, or about 1000 nm to 2500 nm in width, or about 1000 nm to 2000 nm in width, or about 1000 nm to 1500 nm in width, or about 2000 nm to 5000 nm in width, or about 2000 nm to 4500 nm in width, or about 2000 nm to 4000 nm in width, or about 2000 nm to 3500 nm in width, or about 2000 nm to 3000 nm in width, or about 2000 nm to 2500 nm in width, or about 3000 nm to 5000 nm in width, or about 3000 nm to 4500 nm in width, or about 3000 nm to 4000 nm in width, or about 3000 nm to 3500 nm in width, or about 4000 nm to 5000 nm in width, or about 4000 nm to 4500 nm in width.

In further embodiments, the thickness and width of the nanobeam (130) may be of different values to practically optimize the system performance.

In some embodiments, the length of the nanobeam (130) depends on the pixel dimensions (i.e., the dimensions of a device (100)).

In other embodiments, the nanobeam (130) senses the heating of the device by changes in the $VO_2$ resistance.

In some embodiments, one or a plurality of infrared detection devices (100) can be connected to form a detector. In some embodiments, the detector can have a single pixel (i.e, a device (100) as described herein) or arrangement of multiple pixels (i.e, devices (100) as described herein) in a two-dimensional array. In this context, the area of the detector that is covered with pixels (i.e., infrared detection devices (100)) is called an active area. Each pixel (i.e, a device (100) as described herein) within the detector described herein are scalable and can have multiple absorber unit cells (i.e., radiation absorbers (120); or units (FIG. 1B)) that can be put together to form an array (FIG. 1A; i.e., infrared detection devices (100)). In some embodiments, the array may be square or rectangular. In other embodiments, the array may be circular.

In some embodiments, the infrared detection device (100) described herein is fabricated on a substrate (not pictured). In some embodiments, the substrate is a silicon (Si) wafer or wafers with Si compounds. In some embodiments, the support layer (110) is deposited on the substrate. In some embodiments, the substrate and the support layer (110) are separated by creating suspension. A suspended layer is created just to avoid direct contact area between the support layer and substrate. In some embodiments, the substrate and support layer (110) are connected. In other embodiments, the support layer (110) is connected to the substrate by arm (e.g., like a bridge). Without wishing to limit the present invention to any theory or mechanism it is believed that having the support layer (110) and the substrate layer separated by suspension and only connected by arms helps reduce the heat flow from the devices described herein to the substrate layer.

Figure 1B:
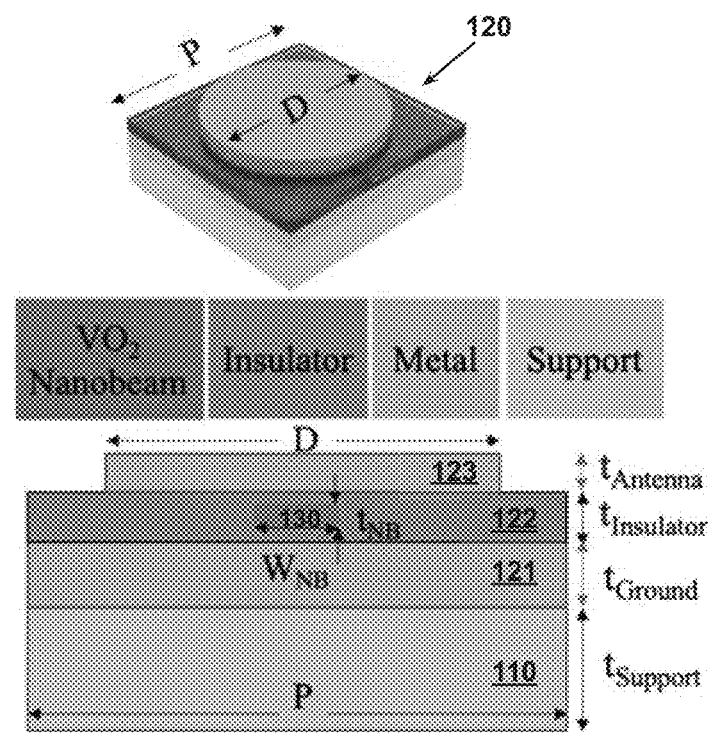

FIG. 1B shows the suspended layer only which is formed on a substrate (not in the Figure for simplicity).

In some embodiments, the device is suspended by the use of mechanically strong and fabrication compatible support layer or layers (110). In some embodiments, the support layer (110) is composed of silicon nitride ($Si_3N_4$). In some embodiments, the support layer (110) comprises multiple alternating layers of metal and dielectric materials (Non-limiting examples include gold (Au) and silicon dioxide ($SiO_2$)) that helps reduce the thermal conductance. In alternative embodiments, a multilayer structure may be added to the bottom of the substrate to trap heat more efficiently.

In some embodiments, the support layer (110) and suspension arms may provide thermal isolation. In some embodiments, thermal isolation may refer to material that reduces the heat escape from the active detector region. For example, suspending the pixels with long and narrow arms or low-thermal conductivity materials or systems (i.e., arrangement of alternating metal and dielectric materials). In other embodiments, the substrate may have no thermal isolation. In some embodiments, the device is placed in vacuum (or vacuum sealed packaging) to provide better thermal isolation.

In some embodiments, a sacrificial layer, support layers (110), metal layers (121 or 123), and insulator layers (122) are deposited onto the substrate. In some embodiments, the sacrificial layer is etched out (i.e., cut) at certain regions which creates a suspension layer standing freely on the arms of the device (100).

In some embodiments, the infrared detection devices (100) described herein further comprise arms (alternatively called legs). As used herein "arms" or "legs" of the devices (100) described herein may be used interchangeably and are used to support the suspended structure (i.e., the device (100)) comprising the plasmonic absorber (120) and the nanobeams (130). In some embodiments, the arms of the device may comprise of silicon nitride, silicon dioxide, or any other low thermal-conductivity material.

In some embodiments, the infrared detection device (100) or a 2-dimensional array of infrared detection devices (100) may be used with a focusing system. In some embodiments, the focusing system is placed in front of the infrared detection device (100) or the 2-dimensional array of infrared detection devices (100) to focus the incoming light (e.g., radiation or infrared radiation). In other embodiments, the focusing system is placed in front of the infrared detection device (100) or the 2-dimensional array of infrared detection devices (100) to increase the amount of light incident on the infrared detection device (100) or a 2-dimensional array of infrared detection devices (100). In some embodiments, the focusing system comprises a lens and aperture.

As used herein a "focusing system" may refer to an arrangement of lenses and apertures to focus the incoming light (e.g., radiation) into the active detector region (i.e., a singular device (100)). The active detector region may comprise a detector area that contains all the detector pixels. In some embodiments, the focusing system comprises two main components: an aperture and lens. In one embodiment, the focusing system may include but is not limited to, at least one lens and at least one aperture.

In some embodiments, the choice of the f-number (or range of f-number) for the focusing system may be determined by the sensitivity and depth requirements. In some embodiments, the active infrared detector region may not have any aperture or focusing properties.

In some embodiments, the focusing system described herein is used to increase the amount of light incident on the detector/pixel array. Commonly used focusing systems may include but are not limited to telescopes or a combination of lenses made out of materials compatible with the wavelength of interest. For near infrared applications, the lens can be made of quartz or silica. For certain bands of far infrared the lens may be calcium fluoride or germanium.

In some embodiments, the focusing system described herein increases the radiation flux (i.e., light energy per unit area). After light gets focused on the detector active area (i.e., a singular device (100) or a 2-dimensional array of infrared detection devices (100)), the active area have much higher incident radiation intensity compared to unfocused radiation incident on the pixel array.

In other embodiments, with a proper focusing system (i.e., lens and aperture), the incoming light (e.g., radiation) efficiently causes spatially distributed thermal buildup in an array of pixels (transducing element or focal plane array (FPA)). In some embodiments, the temperature change in turn modulates the resistivity of the sensitive material present as a nanobeam in each pixel. Thus, the object temperature or radiation may be detected by the change in the electrical current passing through the nanobeam of each individual pixel for a constant supplied voltage. In some embodiments, the electronic current readout of each pixel produces an overall thermal map of the object, wherein a heat map of the body is obtained and presented on an electronic display.

In further embodiments, the present invention features an array for high power detection comprising a plurality of infrared detection devices (100) wherein the devices (100) are arranged in a configuration such that the nanobeams (130) are connected to at least one neighboring device (100).

Without wishing to limit the invention to any particular theory or mechanism it is thought that objects emitting large-enough power, thermal isolation is not essential, as the power is sufficient to generate local heating and change the resistance of the transducing $VO_2$ nanobeam.

In some embodiments, the silicon readout circuit transfers the sensed information for each pixel electrically to produce a thermal image on an object emitting electromagnetic radiation in a specific frequency regime. In other embodiments, the device readout circuit needs to be packaged properly with a focusing system containing a lens (transparent for long-wave IR—LWIR), and an aperture. Radiation from a focused object thus enters through the focusing system and is incident on the active sensing/transducing region which converts the radiation information to electrical signals. In some embodiments, the readout circuit transfers the electrical signal to memory or a display device.

In some embodiments, the present infrared detection devices (100) described herein are able to operate at room temperature or about room temperature. In other embodiments, the present infrared detection device (100) is able to operate without cooling. In some embodiments, the infrared detection device (100) detects infrared in a location without cooling.

In some embodiments, the infrared detection device (100) detects infrared radiation by a change in resistance in the nanobeam. In other embodiments, the circuitry is coupled to a processor, which is coupled to a memory that stores computer-readable instructions that cause the processor to convert electrical resistance signals from the device to a thermal image.

In some embodiments, the infrared detection device (100) may be useful for night vision, environmental sensing, or medical imaging, more particularly when detecting objects with low thermal contrast with high spatial, temporal, and thermal resolution.

In some embodiments, the infrared detection device (100) can be used to continuously monitor the temperature map of a human body. In some embodiments, the infrared detection device (100) may be able to detect the presence of active flu or fever.

The present invention may feature a method of detecting infrared radiation close to background. In some embodiments, the method comprises placing one or more infrared detection devices (100) adjacent to an object; detecting a change in the resistance of a nanobeam in the infrared detection device (100); and producing a thermal map of the object based on the change in resistance of the nanobeam. In some embodiments, the object is a body or an environment.

One of the unique and inventive technical features of the present invention is that the infrared detection devices (100) described herein and/or the 2-dimensional array of infrared detection devices (100) described herein do not require cooling like prior high-sensitivity infrared detectors.

In some embodiments, the infrared detection devices (100) described herein and/or the 2-dimensional array of infrared detection devices (100) described herein require a temperature controller. Without wishing to limit the present invention to any theory of mechanism it is believed that to get the most sensitivity out of the nanobeam transducer (130), the infrared detection devices (100) and/or the 2-dimensional array of infrared detection devices (100) need to be heated up to near the highest TCR point of the nanobeam transducer (130) material to achieve the highest sensitivity. A non-limiting example of a temperature controller can be a Peltier or thermo-electric module attached to the infrared detection devices (100) and/or the 2-dimensional array of infrared detection devices (100) substrate and/or included in the packaging of the detector system (i.e., a 2-D array of infrared detection devices (100)) to control the device temperature electronically.

In some embodiments, the infrared detection devices (100) and/or the 2-dimensional array of infrared detection devices (100) are used with a temperature controller to set the active sensor's temperature. The temperature controller can be used to set the device temperature so that the embedded nanobeam transducer (130) material is near its highest TCR point to achieve highest sensitivity.

In some embodiments, the fabrication of the infrared detection device (100) requires multi-step advanced nanofabrication techniques including but not limited to processes like sputtering, annealing, lift-off, lithography, or nanoengineering.

Example

The following is a non-limiting example of the present invention. It is to be understood that said example is not intended to limit the present invention in any way. Equivalents or substitutes are within the scope of the present invention.

Design: Proposed design has three main components: radiation absorber, VO$_2$ nanobeam, support structure with thermal isolation. The radiation absorber is the key component that determines the absorption efficiency, and it comprises single to multiple unit cells of the plasmonic absorber. VO$_2$ nanobeam functions as the transducing or sensing material. The support structure allows the suspension of the detector pixel and allows thermal isolation. The schematic of a single pixel with 9 absorber unit cells is depicted in FIG. 1A. The unit cell schematic and cross-section including the dimensions are presented in FIG. 1B. The number of unit cells present in a single pixel of the proposed infrared detector is scalable and depends on the absorbed power required for sufficient thermal buildup which, in turn, depends on the thermal isolation of the pixels. For this design, a bolometer pixel with 3×3 unit cells was chosen as a balance of improvement between thermal resolution and spatial resolution. The larger number of unit cells capture more radiation power that results in increased thermal buildup ultimately resulting in a higher responsivity. However, a larger pixel dimension reduces the spatial resolution and degrades the thermal bandwidth of the detector.

The present invention only focuses on the elements in a single pixel and selects a conventional design for the pixel—suspension, support membrane, arms, etc. The optimization of the pixel structure, arm, suspension can be furthered to enhance thermal isolation for better performance, and smaller pixel footprint.

A metal-insulator-metal (MIM) type plasmonic absorber was chosen to efficiently absorb LWIR radiation from an object. At, lower wavelength, it behaves like a near-perfect absorber. Where most other plasmonic absorbers see a significant decrease towards LWIR after scaling, a MIM type absorber demonstrates highly efficient absorption by a sub-wavelength feature that is critical for the present application to reduce the pixel dimensions. The transducing VO$_2$ nanobeam is buried within the insulator. The plasmonic absorption-induced thermal increase locally affects the VO$_2$ nanobeam. Even though silicon dioxide can be used as the insulator layer, it exhibits lossy behavior over a 7 μm wavelength. Magnesium fluoride was chosen as the insulator for optimal design at LWIR. Finally, in the present design, the use of nanobeam instead of a thin film benefits the design.

Without wishing to limit the present invention to any theory or mechanism, it is believed that the use of nanobeam is beneficial to the design in two ways. First, the large length to cross-section ratio amplifies the change in the readout voltage $\Delta V(T) = I_{bias} \rho NB(T) L_{NB}/A_{NB}$ producing high responsivity, where $L_{NB}$ and $A_{NB}$ is the length and cross-sectional area of the VO$_2$ nanobeam, respectively, $\rho_{NB}$ is the temperature dependent resistivity of high-TCR VO$_2$, $I_{bias}$ is the bias current, and $\Delta V$ is the readout voltage. Secondly, since the bandwidth of thermal detectors is mainly determined by thermal mass and thermal conductance, the use of nanobeam instead of a film achieves a reduced pixel thermal mass thus an increase in the speed or bandwidth.

Additionally, the present invention proposes to bias the device temperature at the phase transition point of VO$_2$ to utilize the high-TCR property of VO$_2$. At transition, the TCR can be as high as 200 K$^{-1}$ whereas other commonly used materials have a TCR below 3 K$^{-1}$. However, due to hysteresis, the resistance-temperature fluctuation results in micro-hysteresis, which is deterministic and can be considered to calibrate the voltage readout.

The following subsections provide details of individual components in design and performance point of view.

Plasmonic Absorber: Sub-wavelength plasmonic features have enabled novel applications such as radiation detection, spectroscopy, and sensing. Without wishing to limit the present invention to any theory or mechanism, a plasmonic absorber has the potential to enhance radiation absorption by thermal or infrared detector while keeping a much smaller pixel dimension, thus facilitating higher thermal buildup that is inversely proportional to the material volume and leads to a higher resistivity change of the transducing material.

Not all plasmonic absorbers are efficient over a wide range of wavelengths even after scaling the geometry. Metal-insulator-metal (MIM) type plasmonic structure that exhibits near perfect absorption was chosen for short wave infrared (SWIR), mid-wave infrared (MWIR), and over 55% absorptance at 10 um wavelength or long-wave infrared (LWIR). The schematic of the absorber in the unit cell is shown in FIG. 1B. In the MIM absorber, the metal layer is chosen to be gold, and the insulator layer is chosen to be silicon dioxide (SiO$_2$) or magnesium fluoride (MgF$_2$). The top metal layer can be an array of circular or square patches in general. For optimized absorption at the 10 μm wavelength, a circular patch was chosen with a diameter of 2.6 μm which is placed periodically at a 3 um pitch. Since SiO$_2$ becomes highly reflective between 8-12 μm (Restrahlen band) and loses its ideal insulating behavior, it is not usable as the insulator layer for this wavelength range. However, fluorides of calcium or magnesium can be used instead for a wider wavelength or LWIR specific application.

The key design parameters for the MIM absorber are—period (can be finite or infinite, latter for theoretical simplification of calculation and numerical analysis), top metal layer antenna diameter, insulator or spacer layer thickness, and material (i.e., real and imaginary part of the optical index), metal thicknesses at ground plane and antenna layer. The presence of the $VO_2$ nanobeam, in both—semiconducting and metallic states, has an insignificant contribution to a change in the absorptance profile of a MIM absorber. This is due to the nanobeam's comparatively much smaller dimension than the wavelength and other features in the absorber. The reported absorption spectrums (obtained by optical simulation using COMSOL Multiphysics) in FIGS. 2A, 2B, 3A, 3B, 4A, 4B, and 4C present the effects of each of the design parameters by neglecting the insignificant variation caused by the presence of buried $VO_2$ nanobeam.

Figure 2A:
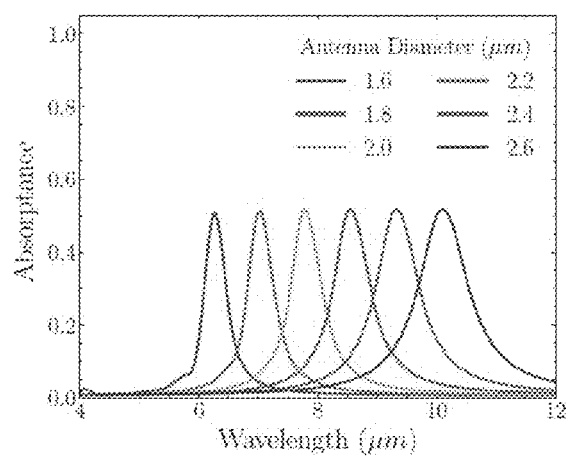
Figure 2B:
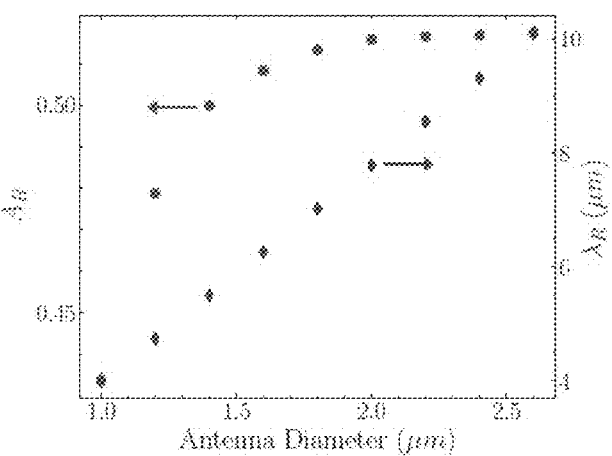

The resonance wavelength of the plasmonic antenna or the peak absorption wavelength can be engineered by tailoring the antenna dimensions. FIGS. 2A and 2B present the absorption spectrum for different diameters of the circular gold (Au) antennas. However, depending on the fabrication process and required deposition temperature of $VO_2$, refractory metals like tungsten and platinum can also be used particularly for the ground metal plane. Copper (Cu), silver (Ag), tungsten (W), titanium (Ti) and platinum (Pt) have also been investigated as the antenna/patches and ground metal planes. However, only the results for gold have been reported as it has the most favorable optical properties at the targeted 10 μm wavelength. FIG. 2B presents the variations in peak absorption efficiency, AR and resonance wavelength, λR for different antenna diameters as can be related with FIG. 2A. The circular markers present the value of resonant absorptance (left y-axis), and the diamond markers present the value of resonant wavelength (right y-axis). The resonance wavelength is blue shifted with the decreasing antenna diameter.

Without wishing to limit the present invention to any theory of mechanism it is believed that there may be a higher absorption efficiency at lower wavelengths. The nearly flat absorption efficiency in FIG. 2B is mainly due to decreasing fill factor since the period was kept the same at 3 μm for all these calculations.

Figure 3A:
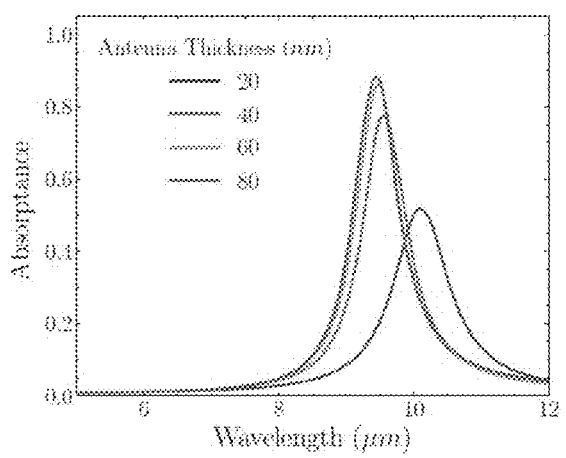
Figure 3B:
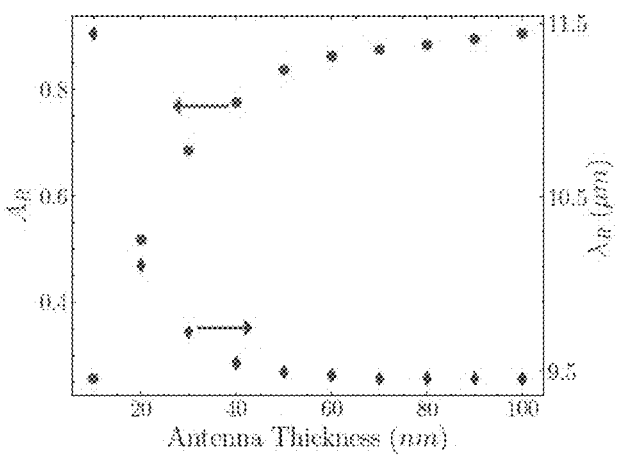

A thicker top metal patch improves absorption because of stronger plasmonic interact ion as shown in FIG. 3A and FIG. 3B. It also adds to thermal mass which is unexpected. However, over 55% absorptance was seen for only a 20 nm thick gold layer as the top metal. The effect of the bottom or ground metal layer thickness is insignificant. A thin bottom layer is desired for lower thermal mass, higher bandwidth as well as less heat spreading by the metal layer. Better thermal isolation and further reduction of heat spreading can be obtained with a discontinuous ground metal. Better thermal isolation and further reduction of heat spreading can be obtained with a discontinuous ground metal. However, it adds to the complexity and steps in the fabrication process. So, to investigate the architecture with a continuous ground film across unit cells in a single pixel was focused on.

Figure 4A:
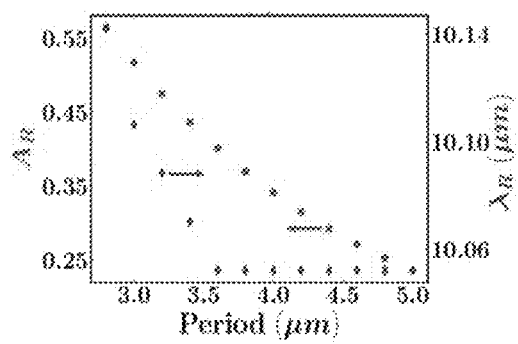
Figure 4B:
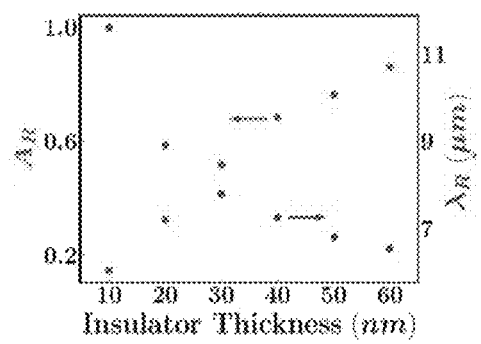
Figure 4C:
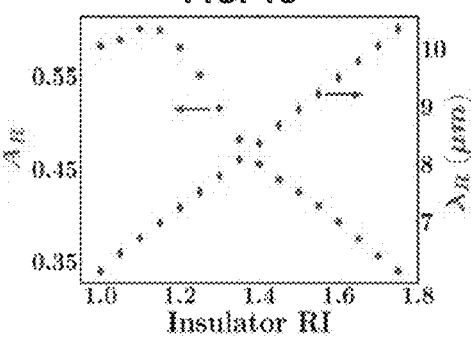

FIGS. 4A, 4B and 4C show the peak absorptance and related wavelength with respect to variation in other design parameters—period of absorber unit cell, insulator material properties, and thickness. The changes in the period of the arrayed structure only impact the absorptance efficiency, not the peak absorbing wavelength. From FIG. 4A, larger absorptance for higher fill factor, F=AntennaDiameter/Period, was observed. The peak absorptance shows a weak exponential decrease with the increase of unit cell period.

The thickness and the material properties i.e., the refractive index of the insulator impacts both—the resonant absorption wavelength as well as peak absorptance value. The effect of the insulator layer thickness is shown in FIG. 4B. Thicker insulator is observed to allow higher absorptance. However, it adds to thermal mass of the pixel and can potentially degrade the overall performance of the detector. The relationship between peak absorptance wavelength and spacer refractive index is found to be linear (with slight variation due to numerical analysis). Additionally, the effect of the refractive index of the insulator layer material is presented in FIG. 4C which shows that a lower range of refractive index allows higher peak absorptance and the resonant wavelength scales linearly with the insulator RI.

To enhance the responsivity, the device transducing material $VO_2$ nanobeam needs to operate at the transition point to have the highest TCR or sensitivity to temperature and radiation. Without wishing to limit the invention to a particular theory or mechanism, the present invention proposes to operate the device at the transition point using a Peltier or thermo-electric heater to heat the $VO_2$ nanobeam to the transition midpoint. Due to hysteresis of the phase transition in $VO_2$, the resistivity vs temperature will trace micro-hysteresis loops for a small radiation fluctuation. However, the nature of the micro-hysteresis is expected to be deterministic unless the material undergoes irreversible change.

Nanobeam: $VO_2$ nanobeam is the transducing element that converts the radiation induced thermal buildup to readable electrical signals. Due to its high temperature coefficient of resistance (TCR), $VO_2$ is a material of choice for bolometer devices. However, due to the close coexistence of different vanadium oxides like $VO_3$, $V_2O_5$, etc., deposited $VO_2$ film is not usually reported to be pure and as sensitive to radiation as one would expect. The present invention uses $VO_2$ nanobeams instead of a film. The large length to cross-section ratio of the nanobeam results in amplified resistance variation with respect to temperature change. The nanobeam experiences the local thermal buildup and shows variation in resistance thus affecting the readout signal. The maximum temperature rise depends on the input radiation intensity as well as the heat escape mechanism.

Bolometer Design: A bolometer pixel is shown in FIG. 1A. A standard suspended pixel shape was chosen with two arms whose implementation can be further optimized. An arrangement of a 3×3 array of absorber unit cells in a pixel was selected with the $VO_2$ nanobeam spiral-traced below the absorbers buried within the insulator layer. The nanobeam is 20 nm thick and 100 nm wide. This is an optimization between thermal and spatial resolution. The number of unit cells is chosen for sufficient radiation absorption to obtain high responsivity at the same time reducing the pixel pitch compared to state-of-the-art reports.

The radiation emitted from the object, after being focused by lenses on the pixels, gets absorbed by the plasmonic absorber elements in a pixel. Local heating and temperature buildup occur due to radiation absorption. The local temperature buildup causes the local portion of the nanobeam to undergo changes in resistivity depending on the temperature level. This change in resistivity carries the information of the radiation emitted from the object. The change is read out from properly biased individual pixels to finally create a thermal map of the object in focus.

Bolometer Thermal Analysis: Thermal conductance, $G_{th}$, and heat capacity, $C_{th}$ are the two key parameters for a bolometer design and performance. Lower thermal conductance ($G_{th}$) allows a larger thermal buildup that results in higher sensitivity infrared detection. This can be achieved by eliminating the heat escape mechanisms. Thus, the ideal limit of performance is the radiative limit. The heat escape can be reduced by implementing structures that demote heat escape by conductance, for example, using a suspended membrane to reduce vertical heat transfer and using long, thin, and narrow arms to reduce lateral heat transfer, and so on. However, the thermal time constant of the detector is inversely proportional to the thermal conductance and directly proportional to the thermal resistance $R_{th}$: $\tau_{th} = C_{th}/G_{th} = C_{th}R_{th}$. Therefore, there is a tradeoff between the detection bandwidth and the heat capacity. Thus, the heat capacity also needs to be lowered to achieve high-bandwidth or speed of operation. The time constant directly defines the refresh rate in thermal cameras.

Figure 5A:
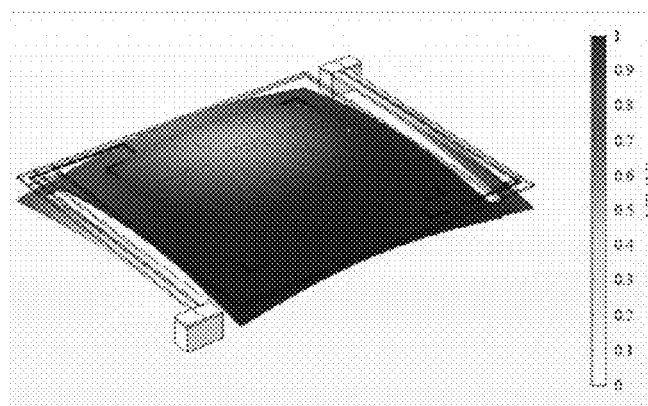

To obtain the thermal conductance of the proposed detector pixel, the amount of heat flux needed to raise the average temperature of the detector pixel by 1 K was calculated. The heat flux was found to be ~30 nW per pixel area, resulting in a thermal conductance, $G_{th} = 3 \times 10^{-8}$ W/K. The thermal profile obtained using COMSOL Multiphysics is shown in FIG. 5A. Such a low value of thermal conductance combined with high TCR of the $VO_2$ nanobeam allows the detection of very low radiation power emitted from the object of interest. This high sensitivity makes it possible even to distinguish tiny temperature differences or a low NETD as discussed herein. The displacement of the pixel in the figure is an exaggerated representation of the thermal response (in this case, only expansion) of the materials. The heat capacity was calculated to be $8.02 \times 10^{-11}$ J/K and the corresponding thermal time constant of 2.67 ms of the detector according to—

$$C_{th} = \sum_{layers} C_i \rho_i t_i A_d \quad \text{(Eq. 1)}$$

where, C indicates heat capacity, $\rho$ is density, t is the thickness, and $A_d$ is the area of each material layer in a pixel.

Figure 5B:
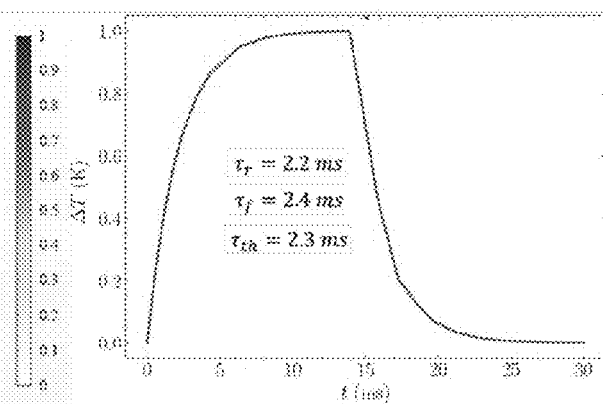

The numerical transient analysis was conducted to extract the time constant of the detector. A square pulsed radiation of 30 nW and 30 ms period is considered to be incident on the detector pixel and the corresponding temperature buildup is calculated numerically. The simulated time response is shown in FIG. 5B. From the figure, an average thermal time constant of 2.3 ms was observed which is in close agreement with the previously calculated value. Due to the smaller pixel dimension and reduced thermal mass in the present design, the time constant is smaller than in recent reports. The thermal time constant defines the minimum response time or maximum bandwidth of the detector. The thermal bandwidth of the detector is calculated to be 108 Hz from the thermal time constant using $$BW = \frac{1}{4\tau_{th}}.$$

The electrical bandwidth is defined by the integration time, and the final output bandwidth depends on the frame rate Bolometer Mechanical Analysis: The bolometer detector needs to be suspended to reduce conductive heat escape to the substrate and surroundings. A 200 nm thick silicon nitride layer was considered as the support as this material is commonly used for micro-electro-mechanical system (MEMS) structures. The low thermal conductivity of silicon nitride allows the device to have low thermal conductance to ultimately obtain a high responsivity. FIGS. 6A and 6B show the numerical results for expected stress and displacement of the detector structure. The stress along the detector structure is below 3 MPa which is 2 to 3 orders lower than the reported endurance limit of a support nitride membrane. Hence, the structure allows cyclic stress to develop upon radiation fluctuations. Also, the displacement for thermal expansion of the materials is below 1 nm. Thus, the detector is mechanically stable and is expected to withstand periodic expansion and compression due to radiation exposure.

Bolometer Performance: To assess the performance of the bolometer, the responsivity and the noise equivalent power was determined. The responsivity of a bolometer is defined as the voltage signal generated for 1 W of incident power. It is defined as Rv—

$$R_v = \frac{K \varepsilon R_{th}}{\sqrt{(1 + \omega^2 \tau_{th}^2)}} \quad \text{(Eq. 2)}$$

Here, $K = I_{bias} \times R_{NB} \times TCR$, where is the bias current, which is considered to be 1 μA (to limit the Joule heating induced temperature change of the detector) through the analysis if not otherwise mentioned, $R_{NB}$ is the nanobeam resistance, TCR is the temperature coefficient of resistance of the $VO_2$ nanobeam, ε is the emissivity of absorbing antennas, $R_{th}$ is the thermal resistance, ω is the angular frequency, $\tau_{th}$ is the thermal time constant of the detector pixel. The responsivity of the detector is thus inversely proportional to the nanobeam cross-sectional area and proportional to the length. Hence, a detector with transducing nanobeams instead of a film thus facilitates higher responsivity. As an example, a nanobeam incorporated in the proposed 12 μm×12 μm detector pixel allows 270× responsivity compared to a film with the same thickness as the nanobeam (but different length to cross-sectional ratio) incorporated in the same pixel. The expected responsivity of the detector vs frequency is shown in FIG. 7A. At a frequency of 100 Hz, a responsivity of over 700 kV/W is expected. As stated before, the $VO_2$ nanobeam is biased at the transition temperature. The responsivity is proportional to the TCR of the transducing material which in turn depends on the device bias temperature. The TCR of VO2 can reduce by two orders of magnitude from on-transition to off-transition temperature. As a result, the responsivity can degrade by up to two orders of magnitude if it is biased far from the transition temperature.

The radiative limit of responsivity, which is the theoretical performance limit of the device is shown in FIG. 7B, Also, the noise equivalent power (NEP), defined as the signal level that produces a signal-to-noise ratio (SNR) of 1, is presented. The NEP calculated for the proposed detector design is very close to the radiative limit. The gap between the proposed detector and theoretical limit comes from the difference in radiative-only thermal conductance and detector thermal conductance.

Noise Analysis: The major sources of noise in a bolometer detector are Johnson or resistive noise ($V_j$), thermal fluctuation noise ($V_{th}$), flicker noise ($V_{1/f}$), and background noise ($V_b$). Johnson noise is white noise and arises from the detector resistance and is proportional to the device bias temperature. It is defined as, $V_j = \sqrt{4kTR\Delta f}$, where k is Boltzmann constant, T is detector temperature, R is resistance mainly defined by the nanobeam resistance, and $\Delta f$ is the bandwidth. The major component of the resistance is the $VO_2$ nanobeam itself. However, by biasing the device at the transition temperature of $VO_2$, the resistivity of the nanobeam $VO_2$ can be reduced by two orders of magnitude compared to its room-temperature semiconductor phase resistivity. This results in a decrease of the Johnson noise and ultimately compensates for the noise development due to increased device temperature. Thus, the overall Johnson noise depends on the bandwidth, operating temperature, and resistance of the device.

Thermal fluctuation noise arises from the temperature fluctuation of the detector. It is proportional to the thermal resistance. As a result, the effort to improve the sensitivity by increasing thermal resistance also increases the thermal fluctuation noise. The temperature fluctuation, $\Delta T$ of the device causes corresponding thermal fluctuation voltage, Vth to appear as noise contribution and is expressed as in equation (3). For the proposed design parameters, this noise was observed to be in the level of tens of microvolts for a given device temperature of 341 K and at a frequency of 100 Hz.

$$V_{th} = \sqrt{K^2 \Delta T^2} = 2KT \sqrt{\frac{k\Delta f}{(1+\omega^2 \tau_{th}^2)} R_{th}} \quad \text{(Eq. 3)}$$

Another source of noise—the background noise, $V_b$ is the noise due to radiative heat exchange between the detector with temperature, $T_d$, and surrounding background with a temperature $T_b$. It is expressed as—

$$V_b = \sqrt{\frac{8\kappa\epsilon\sigma A(T_d^2+T_b^2)}{(1+\omega^2\tau_{th}^2)} K R_{th}} \quad \text{(Eq. 4)}$$

where, $\sigma$ is the Stefan-Boltzmann constant. Being in the order of $10^{-11}$ V over the frequency and bias temperature range of interest, this type of noise has an insignificant contribution to the overall noise and thus can be neglected for the proposed detector.

Figure 8A:
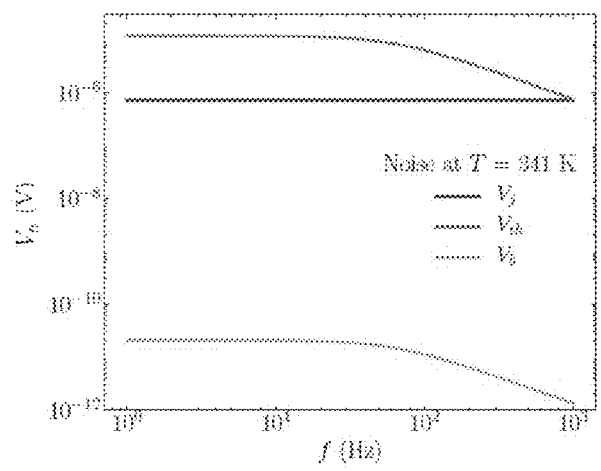
FIG. 8A and FIG. 8B shows all the noise sources in a single figure with respect to (FIG. 8A) frequency at bolometer temperature of 341 K and (FIG. 8B) bolometer temperature at a frequency of 100 Hz.
Figure 8B:
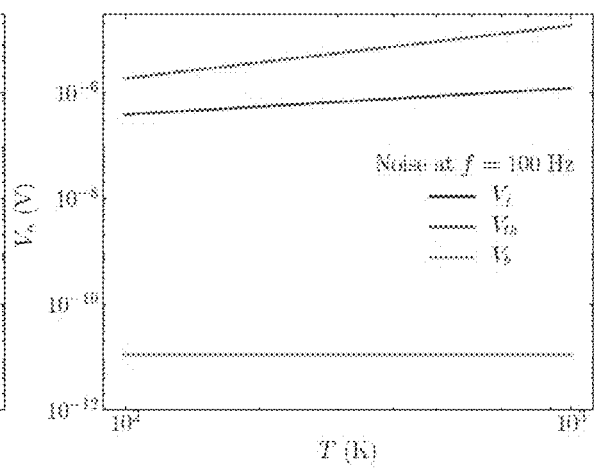

All the noise components and their trends with respect to frequency and device temperature are presented in FIGS. 8A and 8B. Putting all the different noises together, thermal fluctuation noise is observed to be dominant. However, since the flicker noise is highly process and material-dependent, its contribution is ignored. Based on actual device fabrication parameters this type of noise should be added for completeness.

Figure 9A:
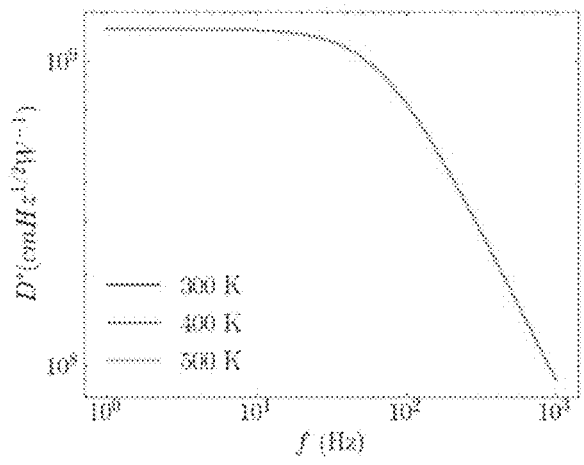
FIG. 9A and FIG. 9B shows the detectivity with respect to (FIG. 9A) frequency at $G_{th}$=30 nW at different temperature levels, and (FIG. 9B) thermal conductance of the bolometer at T=341 K showing the performance limit in terms of detectivity.
Figure 9B:
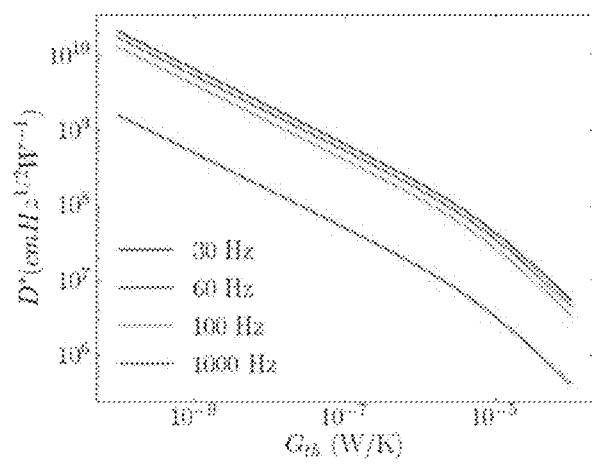

Detectivity and NETD: The detectivity and noise equivalent temperature difference (NETD) are also important performance metrics for an infrared thermal detector. The detectivity is defined as:

$$D^* = \frac{\sqrt{(A_d \Delta f)}}{NEP} = \frac{K\epsilon R_{th}\sqrt{A_d}}{\sqrt{(1+\omega^2\tau_{th}^2)\left(\frac{4kT^2 K^2 R_{th}}{1+\omega\tau_{th}^2}+kTR\right)}} \quad \text{(Eq. 5)}$$

where $A_d$ is the active detector area. The obtained detectivity for the detector presently proposed is shown in FIGS. 9A and 9B. It is presented with respect to frequency, bias temperature, and thermal conductance. From FIG. 9A, it is observed that device temperature has an insignificant impact on the detectivity. This is due to the large coefficient, K, and large thermal resistance, $R_{th}$ as they appear in equation 5. The detectivity with respect to the thermal conductance is presented in FIG. 9B as a reference to the theoretical limit when $G_{th}$ reaches its minimum possible value which is the case when only radiative thermal conductance is considered. Thermal conductance in the present design of the bolometer pixel is 30 nW. As implied in FIG. 9B, with improved design of the pixel arm, suspension, vacuum, and thermal isolation, detectivity can be improved further. Detectivity for 30 Hz and 60 Hz frequency is presented as they are two common refresh-rates currently used for visible wavelength and infrared cameras.

The NETD, on the other hand, is a measure of thermal resolution. It defines the minimum temperature difference that is distinguishable by the detector and is expressed as:

$$NETD = 4\left(\frac{F}{\#}\right)^2 \sqrt{\frac{\Delta f}{A_d}} \left[\int_{\lambda_a}^{\lambda_b} \frac{\delta M(\lambda)}{\delta T} D^*(\lambda)d\lambda\right]^{-1} \quad \text{(Eq. 6)}$$

Where $$\frac{F}{\#}$$

is the aperture F-number, M is radiant existence, $\lambda$ is wavelength. For a bandwidth, $\Delta f$ of 100 Hz and $$\frac{F}{\#}$$

of 1, an NETD of 3.67 mK was obtained which is almost an order lower than the state-of-the-art detector implemented in a smaller pixel (12 µm×12 µm vs 30 µm×30 µm).

Comparison: The detector performance of the present invention was compared with some recent works and state-of-the-art bolometric uncooled detectors. The present design described herein is estimated to have a responsivity of over 700 kV/W at a lower frequency which is a significant improvement over the recently reported detectors. The recently demonstrated detector pixel size is 17 µm×17 µm. The present invention is requiring the pixel size to be 12 µm×12 µm while at the same time providing improved performance in terms of detectivity, responsivity, NETD. The NEP is estimated to be very close to the theoretical limit. Table 1 shows the summary of the comparison (NR stands for not reported). It is observed that the design of the present invention shows improvement in every possible angle even where it is very challenging due to the design dilemma between different parameters.

TABLE 1

|  | Present Invention | [1] | [2] | [3] | [4] | [5] | [6] |
|---|---|---|---|---|---|---|---|
| D*(cmHZ$^{1/2}$W$^{-1}$) | $1.2 \times 10^9$ | $5.4 \times 10^8$ | NR | NR | $1.0 \times 10^7$ | NR | $2.2 \times 10^8$ |
| Rv (V/W) | >7 × 10$^5$ | 5 × 10$^4$ | NR | NR | 1.0 × 10$^4$ | NR | 5 × 10$^5$ |
| T$_{th}$ (ms) | 2.3 | 5.3 | NR | 5.9 | <10 | NR | 4.5 |
| Area (µm × µm) | 12 × 12 | 40 × 40 | 17 × 17 | 17 × 17 | 35 × 35 | 35 × 35 | 17 × 17 |
| G$_{th}$ (nW/K) | 30 | NR | NR | 40 | 700 | NR | 62 |

TABLE 1-continued

|  | Present Invention | [1] | [2] | [3] | [4] | [5] | [6] |
|---|---|---|---|---|---|---|---|
| NETD (mK) | 3.67 | NR | 35 | NR | NR | 71 | NR |
| NEP (pW) | 1 | NR | NR | NR | NR | NR | 100 |

[1] Alkorjia, Omar, et al. "Metasurface Based Uncooled Microbolometer with High Fill Factor." 2019 20th International Conference on Solid-State Sensors, Actuators and Micr EUROSENSORS XXXIII). IEEE, 2019;
[2] Celik, O., et al. "640 × 480 17 um microbolometer uncooled detector development at ASELSAN, Inc." Infrared Technology and Applications XLVI. Vol. 11407. International Society for Optics and Photonics, 2020.;
[3] Kaynak, C. Baristiran, et al. "Thermo-Mechanical Modeling and Experimental Validation of an Uncooled Microbolometer." 2020 IEEE 20th Topical Meeting on Silicon Mono IEEE, 2020;
[4] Smith, Evan M., et al. "Dual band sensitivity enhancements of a VOx microbolometer array using a patterned gold black absorber." Applied optics 55.8 (2016): 2071-207.;
[5] Tankut, Firat, et al. "A 160x120 LWIR-band CMOS Infrared (CIR) microbolometer." Infrared Technology and Applications XLV. Vol. 11002. International Society for Optic.;
[6] Yeh, Tsung-Han, et al. "Performance improvement of Y-doped VOx microbolometers with nanomesh antireflection layer." Optics Express 28.5 (2020): 6433-6442.

It is acknowledged that the properties of $VO_2$ are dependent on the fabrication process, especially temperature, substrate, strain, and geometry. In addition, $VO_2$ nanostructure (nanobeam and nanobeam) resistivity along with its relationship with respect to temperature depends on its geometry and can differ from bulk and thin-film properties by up to an order of magnitude. The resistivity impacts device responsivity and noise performance. The final design, particularly the nanobeam geometry, needs to be optimized by taking into consideration the variations in the fabrication process. Most studies on $VO_2$ nanostructures focus on the mechanically transferred $VO_2$ nanobeams and nanobeams after being synthesized using vapor transport methods. However, random growth and subsequent transfer of $VO_2$ nanostructure are not suitable for the presently proposed design of bolometer pixel as the nanobeam traces integrated with the plasmonic absorbers need to be physically and electrically continuous and aligned with absorbers and electrical contacts. On the other hand, the use of the lift-off technique for patterning the nanobeam traces is not suitable due to the high deposition temperature of $VO_2$ films. Therefore, dry etching of the sputtered $VO_2$ film to pattern the nanobeam is suggested.

Figure 10:
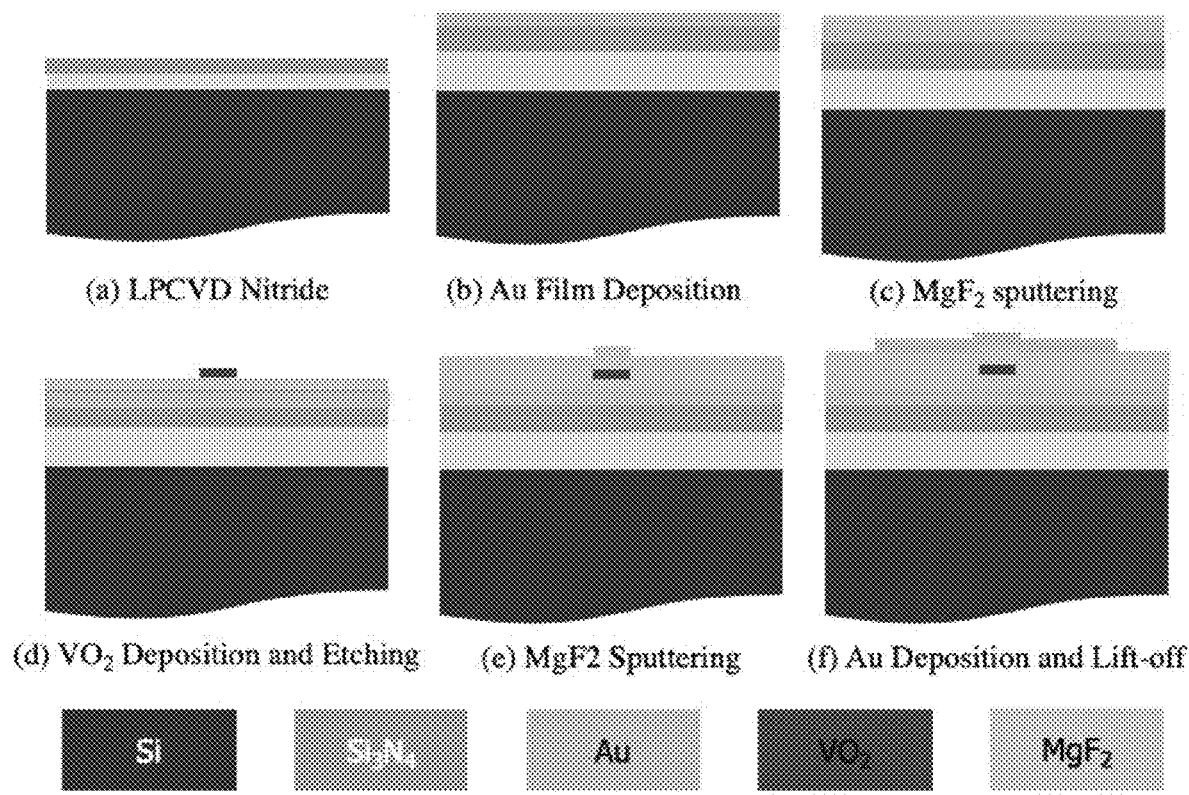
FIG. 10 shows part of the fabrication steps for the infrared detector for a specific implementation. The bump created by the nanobeam does not significantly affect the absorption profile by the plasmonic absorber.

Fabrication Steps: The infrared detector proof-of-concept fabrication steps are shown in FIG. 10. The fabrication of the detector starts with the deposition of a support layer of 200 nm silicon nitride. Then e-beam evaporation of adhesion layer (Ti/Cr) followed by gold of 30 nm. This metal layer acts as the ground plane. Next, the dielectric layer is deposited. The $VO_2$ film is sputtered then patterned and structured to be a nanobeam. Then again, the dielectric layer is deposited to bury the nanobeam within. After that, the adhesion layer and gold e-beam are evaporated again and patterned based on the design using resist patterning and lift-off techniques. The subsequent depositions after the nanobeam patterning leaves a tiny bump. However, this bump does not alter the absorption profile significantly. The deposited layers are suspended by substrate etching and the release process to create thermal isolation. The suspension is only necessary for very low-power radiation detection. Metallic connectors and vias are deposited and patterned and the detector is finally suspended.

Described herein is a novel LWIR detector architecture with plasmonic absorber and $VO_2$ nanobeam integrated. The plasmonic absorber allows efficient and selective radiation detection from the radiating object. The design of the absorber can be scaled to tune the wavelength or temperature band of interest. Additionally, the sub-wavelength plasmonic features allow the detection of wavelength by a detector with a much smaller form factor. The use of $VO_2$ nanobeam, instead of a simple $VO_2$ film, amplifies the slope of the temperature dependent resistance due to the large ratio between length to a cross-sectional area of the nanobeam allowing high responsivity. The proposed design and estimated performance are desired for mission critical applications where high sensitivity, high bandwidth, and noise-immunity come as strict requirements such as thermal and medical imaging, night vision, detection, and tracking, etc. Described herein is the numerical analysis, noise analysis, and figure of merits of the proposed detector design. The structural, thermal, and transient analyses of the bolometer are discussed. Whereas the conventional approach trades off performance with active detector area; the present invention observes significantly improved detectivity, NETD, responsivity for a detector of smaller form-factor. The design allows improvement in spatial resolution as well as thermal responsivity. A responsivity of over 700 kV/W at 100 Hz was obtained for only a 12 µm×12 µm pixel size. The noise equivalent temperature difference for the proposed design is calculated to be as low as 3.67 mK, almost an order lower than detectors reported with a larger pixel dimension As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:
1. An infrared detection device (100), the device comprising:
   a) a radiation absorber (120) comprising:
      i) a support structure (110);
      ii) a first metal layer (121) disposed on the support structure (110);

iii) an insulator layer (122) disposed on the first metal layer (121), wherein the first metal layer (121) is sandwiched between the support structure (110) and the insulator layer (122); and iv) a second metal layer (123) disposed on the insulator layer, wherein the second metal layer (123) is patterned; and b) a high-temperature coefficient of resistance (TCR) nanobeam (130) embedded within the radiation absorber (120).

2. The device of claim 1, wherein the device is configured to detect infrared radiation from objects near ambient temperatures.

3. The device of claim 1, wherein the device is further configured to detect infrared radiation from objects at a temperature of 300 K to 2800 K.

4. The device of claim 1, wherein the TCR nanobeam (130) is a vanadium-dioxide ($VO_2$) nanobeam, or a vanadium-pentoxide ($V_2O_5$) nanobeam.

5. The device of claim 1, wherein the radiation absorber (120) is a plasmonic absorber.

6. The device of claim 1, wherein the support structure (110) comprises low-thermal conductivity dielectrics made of silicon or silicon dioxide.

7. The device of claim 1, wherein the first metal layer (121) comprises gold, silver, nickel, aluminum, tungsten, titanium, platinum, molybdenum or copper.

8. The device of claim 1, wherein the second metal layer (123) comprises gold, silver, nickel, aluminum, tungsten, titanium, platinum, molybdenum or copper.

9. The device of claim 1, wherein the second metal layer (123) is patterned into circular or square patches.

10. The device of claim 1, wherein the insulator layer (122) is magnesium fluoride.

11. An array for high sensitivity low power detection comprising a plurality of infrared detection devices (100) according to claim 1, wherein the devices (100) are arranged in a configuration such that the nanobeams (130) connect at least two neighboring devices (100) together.

12. A method of detecting infrared radiation dose the background, the method comprising:
a) placing one or more infrared detection devices (100) of claim 1 adjacent to an object;
b) detecting a change in the resistance of the nanobeam (130) in the infrared detection device (100); and
c) producing a thermal map of the object based on the change in resistance of the nanobeam (130).

13. An infrared detection device (100), the device comprising:
a) a radiation absorber (120), wherein the radiation absorber comprises:
i) a support structure (110); and
ii) a plurality of alternating metal and insulator layers disposed on the support structure (110); and
b) a high-temperature coefficient of resistance (TCR) nanobeam (130) embedded within the radiation absorber (120).

14. The device of claim 13, wherein the device is configured to detect infrared radiation from objects near ambient temperatures.

15. The device of claim 13, wherein the device is further configured to detect infrared radiation from objects at a temperature of 300 K to 2800 K.

16. The device of claim 13, wherein the TCR nanobeam (130) is a vanadium-dioxide ($VO_2$) nanobeam, or a vanadium-pentoxide ($V_2O_5$) nanobeam.

17. The device of claim 13, wherein the radiation absorber (120) is a plasmonic absorber.

18. The device of claim 13, wherein the support structure (110) comprises low-thermal conductivity dielectrics made of silicon or silicon dioxide.

19. An array for high power detection comprising a plurality of infrared detection device (100) of claim 13, wherein the devices (100) are arranged in a configuration such that the nanobeams (130) are connected to at least one neighboring device (100).

20. A method of detecting infrared radiation dose the background, the method comprising:
a) placing one or more infrared detection devices (100) of claim 13 adjacent to an object;
b) detecting a change in the resistance of the nanobeam (130) in the infrared detection device (100); and
c) producing a thermal map of the object based on the change in resistance of the nanobeam (130).

* * * * *